United States Patent (10) Patent No.: US 8,682,627 B2
Djelassi et al. (45) Date of Patent: Mar. 25, 2014

(54) ESTIMATING A STREAM TEMPERATURE IN A TURBOJET

(75) Inventors: Cedrik Djelassi, Marolles en Hurepoix (FR); Bruno Robert Gaully, Marolles en Hurepoix (FR)

(73) Assignee: SNECMA, Paris (FR)

( * ) Notice: Subject to any disclaimer, the term of this patent is extended or adjusted under 35 U.S.C. 154(b) by 214 days.

(21) Appl. No.: 13/133,790

(22) PCT Filed: Dec. 8, 2009

(86) PCT No.: PCT/FR2009/052449
§ 371 (c)(1),
(2), (4) Date: Jun. 9, 2011

(87) PCT Pub. No.: WO2010/067011
PCT Pub. Date: Jun. 17, 2010

(65) Prior Publication Data
US 2011/0246151 A1 Oct. 6, 2011

(30) Foreign Application Priority Data
Dec. 9, 2008 (FR) ...................................... 08 58381

(51) Int. Cl.
G06F 17/10 (2006.01)
G01K 13/02 (2006.01)
G01K 7/42 (2006.01)
F02C 9/00 (2006.01)
G06F 17/40 (2006.01)

(52) U.S. Cl.
CPC ....................................... *G01K 7/42* (2013.01)
USPC ....................................... 703/7; 703/2; 703/9

(58) Field of Classification Search
None
See application file for complete search history.

(56) References Cited

U.S. PATENT DOCUMENTS

| 4,215,412 | A | * | 7/1980 | Bernier et al. | ................ 701/100 |
| 5,080,496 | A | * | 1/1992 | Keim et al. | .................... 374/169 |
| 7,246,495 | B2 | * | 7/2007 | Muramatsu et al. | ............ 60/773 |
| 2006/0212281 | A1 | * | 9/2006 | Mathews et al. | ................... 703/7 |
| 2007/0073525 | A1 | * | 3/2007 | Healy et al. | ....................... 703/7 |
| 2008/0178600 | A1 | * | 7/2008 | Healy et al. | ....................... 703/7 |
| 2009/0173078 | A1 | * | 7/2009 | Thatcher et al. | ................... 703/7 |

FOREIGN PATENT DOCUMENTS

DE  10 2006 042 874    3/2008

OTHER PUBLICATIONS

U.S. Appl. No. 13/132,796, filed Jun. 3, 2011, Djelassi.
International Search Report issued May 12, 2010 in PCT/FR09/52449 filed Dec. 8, 2009.

* cited by examiner

*Primary Examiner* — Kamini S Shah
*Assistant Examiner* — Jay B Hann
(74) *Attorney, Agent, or Firm* — Oblon, Spivak, McClelland, Maier & Neustadt, L.L.P.

(57) ABSTRACT

An estimation method that can estimate a stream temperature in a turbojet including: digitally modeling the stream temperature with help of a modeled signal; and correcting the modeled signal with help of an error signal, a signal obtained after correction representing an estimate of the stream temperature. When predetermined conditions relating to at least one operating stage of a turbojet and to temperature stability are satisfied, the error signal is updated from the modeled signal and from a measurement signal of the stream temperature as delivered by a temperature sensor.

7 Claims, 3 Drawing Sheets

# ESTIMATING A STREAM TEMPERATURE IN A TURBOJET

BACKGROUND OF THE INVENTION

The invention relates to the general field of aviation.

More particularly, it relates to estimating parameters in an aircraft turbojet, such as the temperature of a fluid, for example.

A preferred but non-limiting application of the invention lies in the field of systems for regulating and controlling turbojets.

In known manner, in order to regulate and adapt the control of a turbojet to various flight constraints, it is necessary to estimate the temperature of various gas streams passing through the turbojet (referred to as stream temperatures). For this purpose, use is made of temperature sensors such as probes or thermocouples that are positioned in various locations in the gas streams and that are adapted to measure the temperatures of said gas streams.

Temperature sensors generally suffer during a measurement from thermal inertia that is specific to each sensor and that depends in particular on the mass or the size of the sensor. This inertia is reflected in a time shift between the moment at which the measurement is effected by the sensor and the moment at which it delivers a signal in response to that measurement. This is referred to as the measurement lag effect and can cause malfunctions of the jet engine because of measurement mismatch, in particular during rapid variations in the temperatures of the gas streams.

In order to avoid such a malfunction, it is possible to envisage using sensors that present very low inertia. Nevertheless, such sensors are very expensive.

To alleviate this problem there exist techniques for correcting the measurement signals delivered by a temperature sensor that compensate the lag effect induced by the inertia of the sensor. One such technique is described in U.S. Pat. No. 5,080,496, for example.

Those techniques generally rely on digital modeling of the inertia of the sensor using a filter with parameters set by estimating the time constant of the sensor. As is known in itself, the time constant of a measurement sensor characterizes its response time, i.e. its inertia.

Prior art techniques for estimating the time constant of a temperature sensor use fixed graphs depending on one or more parameters, for example the flow rate of the fluid in which the sensor is placed. Those graphs indicate mean values of time constants for response time templates and predetermined conditions. In other words, they do not in fact take account of the spread of inertia from one temperature sensor to another.

Current fabrication technologies do not enable temperature sensors for controlling jet engines to be produced at low cost and that also comply with a response time template subject to little spread. Consequently, it is difficult to obtain graphs adapted to the various temperature sensors concerned. Numerous problems have arisen when the time constants of the sensors mounted in a jet engine depart considerably from the values given by these graphs.

One solution would be to test each temperature sensor, for example in a wind tunnel, to determine its time constant under predefined conditions, and to extrapolate the graphs as a function of the time constants determined in this way. Such a test is particularly costly, however, and represents approximately one-third of the price of the temperature sensor. Consequently, it cannot be used for each temperature sensor, which means that a temperature sensor outside an acceptance template for which a graph is available might not be detected.

Furthermore, such tests are often carried out at fluid flow rates limited by the capacities of a wind tunnel and they are generally not able to cover the range of working flow rates in jet engine applications. Extrapolating graphs to cover all the range of working flow rates introduces inaccuracies into the acquisition system of the temperature sensor.

Moreover, as mentioned above, the time constant of a temperature sensor depends on parameters such as the flow rate of the fluid in which the sensor is placed. This means that in order to estimate the time constant of a temperature sensor it is necessary first to estimate this fluid flow rate. Consequently, it is necessary to use additional estimator modules on the jet engine, which makes correcting measurements even more complex.

Consequently, there exists a need for a method of estimating a stream temperature in a turbojet, which method is simple and inexpensive and delivers an estimate of said temperature that is accurate so as to be suitable for use in particular in regulating and controlling the turbojet.

OBJECT AND SUMMARY OF THE INVENTION

The present invention satisfies this need by proposing an estimation method for estimating a stream temperature in a turbojet, the method comprising:
  a step of digitally modeling the stream temperature with the help of a modeled signal; and
  a correction step of correcting the modeled signal with the help of an error signal, the signal obtained after correction representing an estimate of the stream temperature;
  wherein, when predetermined conditions relating to at least one operating stage of the turbojet and to temperature stability are satisfied, the error signal is updated from the modeled signal and from a measurement signal of the stream temperature as delivered by a temperature sensor.

Thus, instead of estimating a stream temperature of a turbojet by means of a measurement from a sensor that has been corrected with the help of an estimate of the time constant of said sensor, as in the prior art, the invention proposes estimating said stream temperature by using a digital model that is corrected with the help of an error signal that is evaluated while the turbojet is operating in a stage of temperature stability, under conditions that are predetermined relating to at least one operating stage of the turbojet.

As a result, expensive calculations for estimating the time constant of the sensor are avoided, thereby lightening the load on the computer of the turbojet, i.e. typically on the full authority digital engine controller (FADEC).

The invention makes it possible, at low cost, to obtain a good quality estimate of the stream temperature under consideration. This avoids having recourse to expensive temperature sensors that present very low inertia.

The invention relies on digital models of stream temperature that already exist and that are themselves known. Such digital models generally give a good representation of variation of stream temperature in a turbojet (i.e. of its dynamic behavior), but they are not very accurate concerning the "absolute" values taken by such a temperature, i.e. they present a static error relative to the real stream temperature of the turbojet. The invention proposes correcting this static error so as to obtain an accurate estimate of the stream temperature under consideration.

For this purpose, it makes use of an error signal that is updated during stages of temperature stability with the help of a measurement signal coming from a temperature sensor. It is easy to detect that a temperature stability condition is satisfied, e.g. by comparing the derivative of the measurement signal delivered by the sensor with a predetermined threshold.

Furthermore, the accuracy and dynamic requirements that need to be satisfied by the temperature sensor used in the invention are low since the measurement signal delivered by the temperature sensor is taken into consideration for correcting the model of the stream temperature of the turbojet only during a stage of temperature stability. It is thus possible to use low cost temperature sensors that present long time constants, providing those time constants are compatible with the stages of temperature stability of the turbojet (i.e. shorter than the duration of the stages of temperature stability of the turbojet).

Furthermore, the invention advantageously takes account of the operating stages of the turbojet. It thus makes it possible to estimate a different error signal depending on the operating stage in which the turbojet is to be found. The static error of existing digital models during a stage of starting may well be different from a static error during a stage of operation at "full throttle".

In a particular embodiment of the invention, the error signal is updated with the help of an adaptive algorithm.

The error signal may in particular be updated from the signal obtained by subtracting the modeled signal from the measurement signal.

As a result, a good estimate is obtained of the static error presented by the modeled signal.

During a stage of temperature stability, the temperature sensor, even if it suffers from a large amount of inertia, is nevertheless capable of providing a good "absolute" representation of the stream temperature that it measures in the turbojet. This representation, as subtracted from the value of the signal as modeled during the stage of temperature stability, thus makes it possible to estimate accurately the static error that is presented by the modeled signal.

The error signal may be updated with the help of a filter of the integral corrector type having a predetermined gain setting, the gain preferably not being unitary.

Such a filter is itself known, and presents good performance for correcting the modeled signal.

In a variant, other filters could be used, such as for example filters of higher orders. The particular order selected for the filter taken into consideration for updating the error signal may be the result of a compromise between the accuracy that is obtained and the complexity of the calculations implemented.

In a variant implementation, the estimation method further comprises a step of using a non-volatile memory for storing the most recent updated error signal before stopping the turbojet.

Advantageously, this value may be used in particular for initializing the adaptive algorithm for updating the error signal, instead of using a predetermined initial value (e.g. zero). This can serve to accelerate the convergence of the adaptive algorithm or it may be used as a default value for the error signal while waiting to detect a stage of temperature stability after starting the turbojet.

Correspondingly, the invention also provides an estimator system for estimating a stream temperature of a turbojet, the system comprising:

means for digitally modeling said stream temperature with the help of a modeled signal;
means for correcting the modeled signal with the help of an error signal, the signal obtained after correction representing an estimate of the stream temperature; and
means that are activated when predetermined conditions relating to at least one operating stage of the turbojet and to temperature stability are satisfied, which means are for updating the error signal from the modeled signal and from a measurement signal of the stream temperature as delivered by a temperature sensor.

The invention also provides a turbojet including at least one system for estimating a stream temperature in the turbojet, the system being of the above-described type.

BRIEF DESCRIPTION OF THE DRAWINGS

Other characteristics and advantages of the present invention appear from the following description with reference to the accompanying drawings that show an implementation having no limiting character. In the figures.

DETAILED DESCRIPTION OF AN EMBODIMENT

Figure 1:
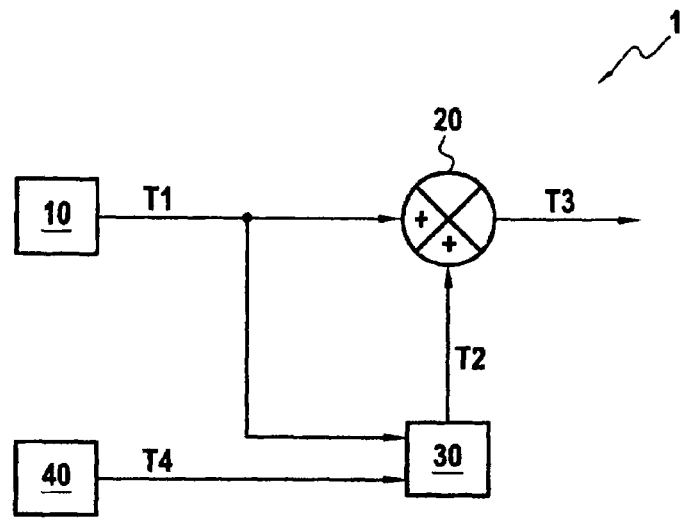
FIG. 1 is a diagrammatic view showing one particular embodiment of an estimator system in accordance with the invention for estimating a stream temperature in a turbojet.

FIG. 1 shows a particular embodiment in accordance with the invention of an estimator system 1 for estimating a stream temperature in an airplane turbojet (not shown in the figure).

The estimated flow passage temperature may be used in particular for regulating and controlling the turbojet. Thus, in the embodiment described herein, all or part of the estimator system 1 is coupled to or incorporated in the full authority digital engine controller (FADEC) device of the airplane propelled by the turbojet.

Nevertheless, and naturally, other uses may be envisaged for the stream temperature estimated by using the method of the invention.

In the example described, it is the stream temperature $T_{25}$ at the inlet of the high pressure compressors of the turbojet that is to be estimated.

In accordance with the invention, the estimator system 1 comprises a digital modeling module 10 used for modeling the stream temperature $T_{25}$.

The signal T1 delivered by the digital modeling module 10 is then sent to a corrector module 20 suitable for adding an error signal T2 to the modeled signal T1.

The signal T3 obtained after correction represents an estimate of the stream temperature $T_{25}$ in the turbojet, for use in this example in controlling and regulating the turbojet.

The error signal T2 added by the corrector module 20 to the modeled signal T1 is evaluated by a calculation module 30 on the basis firstly of the modeled signal T1 and secondly of a measurement signal T4 measuring the stream temperature $T_{25}$ as delivered by a temperature sensor 40 situated in the turbojet. The structure and the operation of such a temperature sensor are themselves known and they are not described in greater detail herein.

Figure 2:
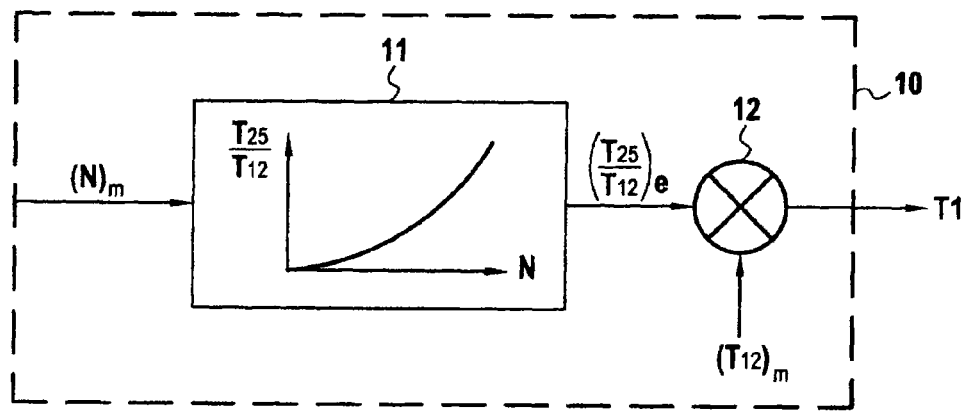
FIG. 2 is a diagrammatic view of an example of a digital modeling module suitable for use in the estimator system shown in FIG. 1 for modeling the stream temperature.

With reference to FIG. 2, there follows a description of an embodiment of the digital modeling module 10. Such a module is described in particular in document U.S. Pat. No. 5,080, 496.

In the example shown in FIG. 2, the digital modeling module 10 comprises an entity 11 adapted to deliver an estimate of the temperature ratio $T_{25}/T_{12}$, written $(T_{25}/T_{12})_e$, based on a measurement $(N)_m$ of the speed of rotation of the turbojet fan, where $T_{12}$ designates the inlet temperature of said fan.

This estimate is calculated by the entity 11 using a predetermined curve showing variation in the adiabatic ratio of temperatures $T_{25}/T_{12}$ as a function of the speed of rotation N of the fan. Such a curve is known to the person skilled in the art and is not described in greater detail herein.

The estimated ratio $T_{25}/T_{12}$ is then sent to a multiplier circuit 12 adapted to multiply said ratio by a measurement of the temperature $T_{12}$, written $(T_{12})_m$. At the output from the multiplier circuit 12, this produces the signal T1 modeling the stream temperature $T_{25}$.

The measurement $(T_{12})_m$ of the temperature $T_{12}$, and the measurement $(N)_m$ of the speed of rotation of the fan are obtained using sensors situated in the turbojet and themselves shown, and they are not described in greater detail herein.

In a variant, a more elaborate and more accurate digital model of the stream temperature $T_{25}$ may be used. One such model is described in particular in document U.S. Pat. No. 5,080,496.

It should be observed that in the example described herein, attention is given to correcting a modeled signal that is representative of the temperature $T_{25}$. Nevertheless, the invention applies to other stream temperatures in a turbojet, providing a model is available for the way those temperatures vary.

Figure 3:
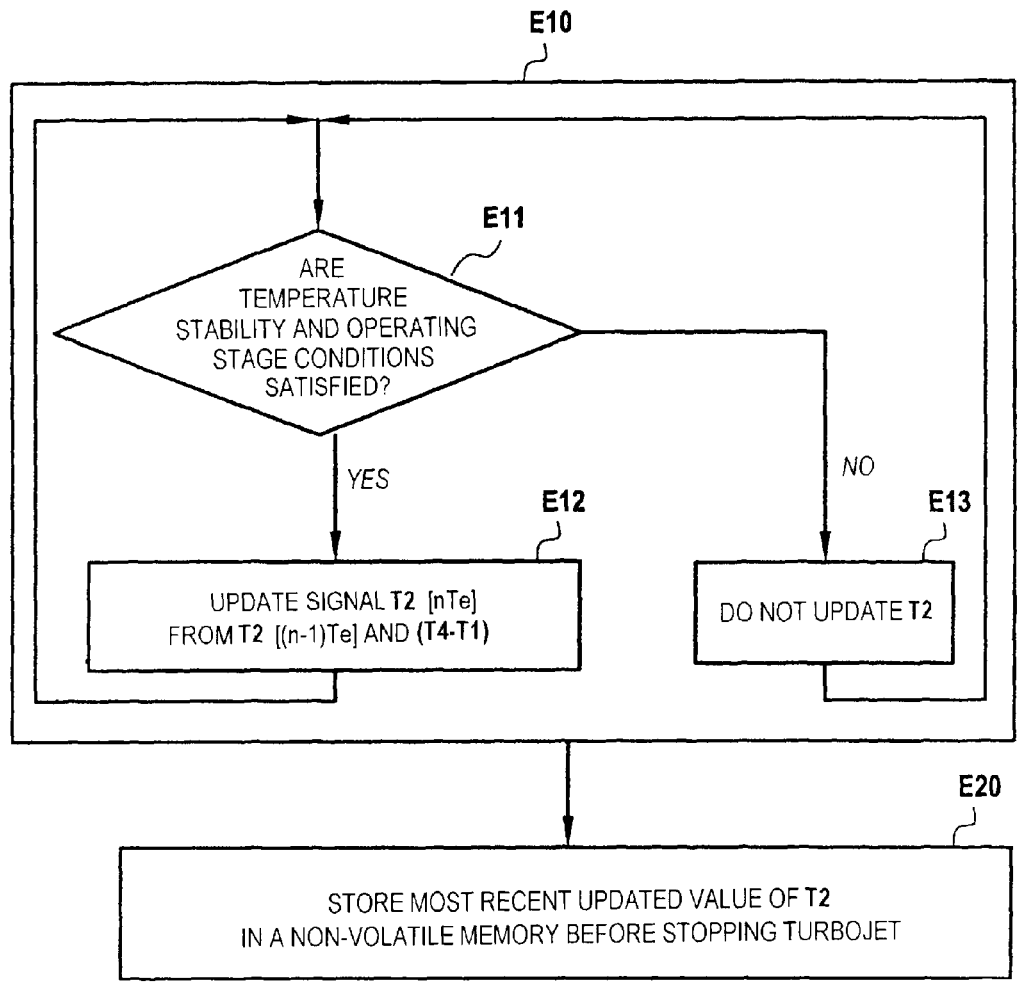
FIG. 3 is in the form of a flow chart showing the main steps implemented for evaluating the error signal used for correcting the signal as modeled during the method of estimation of the invention, in a particular implementation and while implemented in the system shown in FIG. 1.

With reference to FIG. 3, there follows a description of the main steps implemented by the calculation module 30 in order to evaluate the error signal T2 used during the estimation method of the invention, in a particular embodiment of the invention.

In the description below, consideration is given to signals and parameters that are sampled with a sampling period Te. It should be observed that the invention may also be implemented with signals and parameters that are continuous.

In accordance with the invention, while the turbojet is in operation (E10), the calculation module 30 updates the error signal T2 from the modeled signal T1 and the measurement signal T4, so long as predetermined conditions relating to temperature stability and to at least one operating stage of the turbojet are satisfied.

More precisely, in the embodiment described herein, when these conditions are satisfied (step E11), the error signal T2 is evaluated at a given instant t=nTe (n being an integer, Te designating the sampling period), using an adaptive filter of the integral corrector type in application of the following equation (step 12):

$$T2[nTe]=T2[(n-1)Te]+K\times\epsilon[nTe]$$

in which:

$$\epsilon[nTe]=T4[nTe]-T1[nTe]$$

and:

K is a predetermined real number designating the gain of the integral corrector filter;

T2[nTe], $\epsilon$[nTe], T4[nTe] and T1[nTe] designate respectively the error signal T2, the signal $\epsilon$, the measurement signal T4, and the modeled signal T1 as sampled at the instant nTe.

In a variant, higher order filters may be used for evaluating the signal T2.

When it is determined that one and/or the other of the above-mentioned conditions is/are not satisfied (step E11), the most recently updated value of the error signal T2 is used by the corrector module 20 to correct the modeled signal T1 (step E13). In other words, in equivalent manner:

$$T2[nTe]=T2[(n-1)Te]$$

It should be observed that in the embodiment described herein, before stopping the turbojet, the most recently updated value (written V2f) of the error signal T2 is stored (step E20) in a non-volatile memory of the FADEC (not shown in FIG. 1). Such storage is itself known and is not described in further detail herein.

The value V2f as stored in this way may be used advantageously next time the turbojet is in operation, in order to initialize the integral corrector filter.

Figure 4:
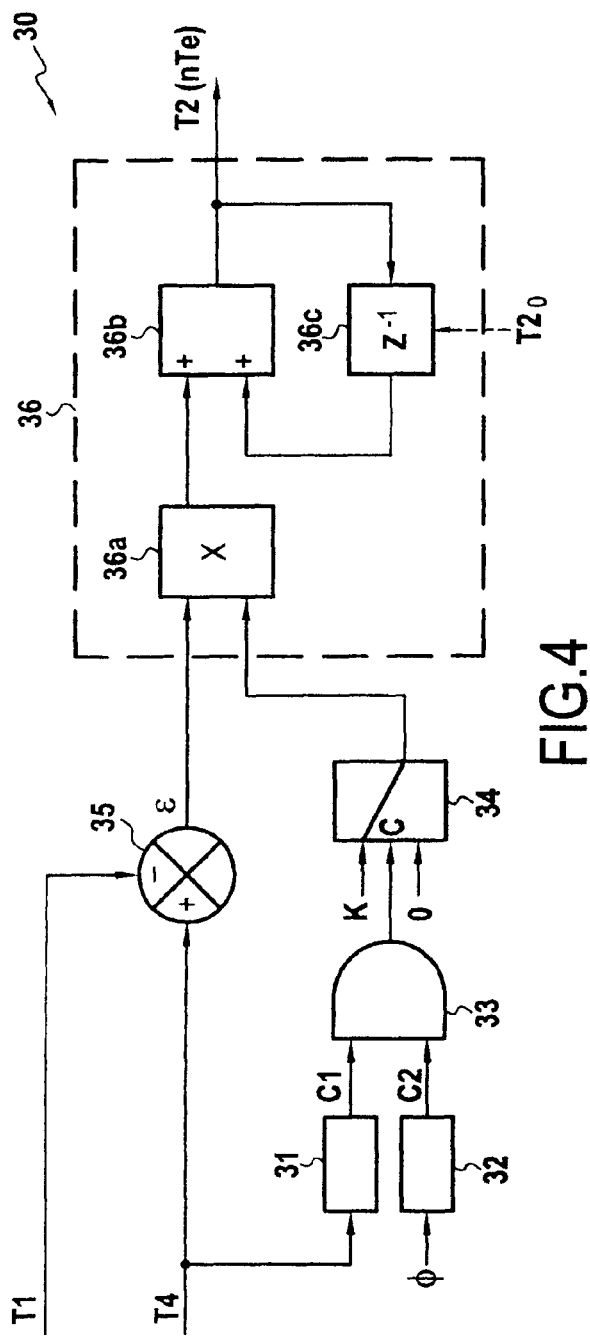
FIG. 4 is a diagram of an example of means suitable for being implemented to evaluate the error signal used for correcting the modeled signal during the estimation method of the invention, in a particular embodiment and when implemented by the system shown in FIG. 1.

With reference to FIG. 4, there follows a description of an embodiment of the means implemented by the calculation module 30 to perform steps E11 to E13 as shown in FIG. 3.

In the meaning of the invention, it is considered that a temperature stability condition is satisfied if the stream temperature under consideration, here the temperature $T_{25}$, is stable over a predetermined time period, in other words if it varies little or not at all over said period (within the limits of a predefined threshold value).

Also, in the meaning of the invention, it is considered that a condition relating to at least one operating stage of the turbojet is satisfied if the turbojet is in at least one of said operating stages.

In the embodiment described herein, in order to verify whether both of the above-mentioned conditions are satisfied, these two conditions are examined separately using two distinct modules, namely:

the temperature stability condition is examined by a first verifier module 31; and the condition relating to at least one operating stage of the turbojet is examined by a second verifier module 32.

Figure 5:
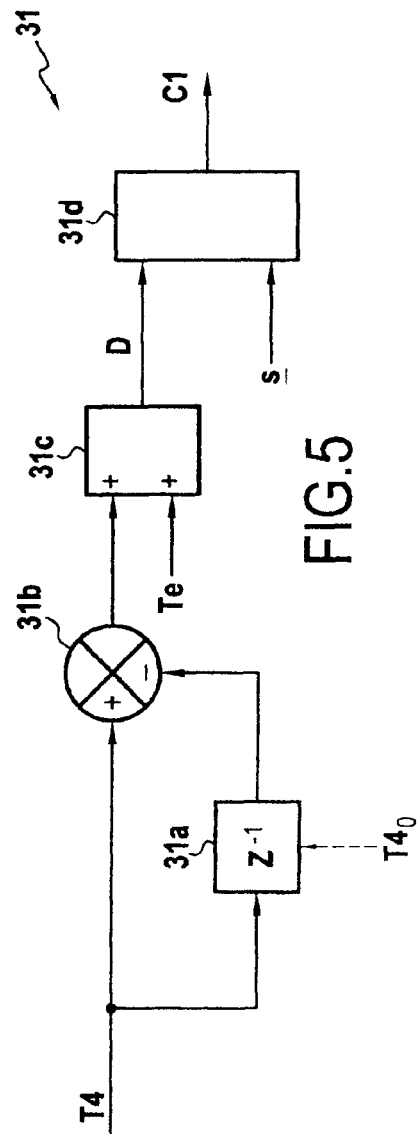
FIG. 5 is a diagram showing an example of detector means for detecting a temperature stability condition suitable for implementing in the estimation method of the invention.

An example of a verifier module 31 suitable for examining whether a temperature stability condition is satisfied is shown in FIG. 5 and is described below.

In order to verify whether a temperature stability condition is satisfied, the verifier module 31 calculates a signal D that is representative of the derivative of the measurement signal T4 as delivered by the temperature sensor 40 at instant t=nTe.

The signal D is evaluated here by using a first-order filter using the following equation:

$$D[nTe]=\frac{T4[nTe]-T4[(n-1)Te]}{Te}$$

where D[nTe] and T4[nTe] respectively represent the signals D and T4 as sampled at instant nTe (it should be observed that at instant t=0, T4[0] is taken to be equal to a predefined initial value $T4_0$).

For this purpose, and in known manner, the verifier module 31 comprises:

a delay cell 31a delivering the value of the measurement signal T4 at the preceding instant (n-1)Te;

a subtractor element 31b for subtracting the delayed measurement signal T4[(n−1)Te] from the measurement signal T4[nTe]; and a divider element 31c adapted to divide the output from the element 31b by the sampling period Te.

In a variant, the derivative D of the signal T4 at instant t=nTe may be calculated using a higher order filter.

The value of D[nTe] as obtained at the output from the divider element 31c is then compared with a predefined threshold value s by a comparative 31d of the verifier module 31. The threshold value s represents the value of the derivative of temperature from which it is considered that the temperature is stable, i.e. from which it is considered that the turbojet is in a stage of temperature stability.

The comparator 31d is adapted in this example to deliver:

a signal C1 equal to 1 if the value of D[nTe] is less than or equal to the threshold value s; and a signal C1 equal to 0 if the value of D[nTe] is greater than the threshold value s.

The second verifier module 32 verifies whether the turbojet is in a particular predefined operating stage, such as for example a "start" stage or a "full throttle" stage.

The error signal T2 to be taken into consideration for correcting the modeled signal T1 need not necessarily be the same in the different operating stages in which the turbojet is to be found.

Thus, if there is a difference between the corrections to be applied to the modeled signal during various predefined operating stages of the turbojet, such as for example during a start stage P1 and a "full throttle" operating stage P2 of the turbojet, the correction signal T2 is updated during each of those two stages. Under such circumstances, the second verifier module 32 verifies whether the current operating stage of the turbojet, written φ, as identified by the FADEC using known means, and as transmitted to the verifier module 32, is equal to the stage P1 or to the stage P2. Where appropriate, the verifier module 32 delivers a signal C2 equal to 1. If the current operation stage φ is different from P1 and from P2, then the verifier module 32 delivers a signal C2 equal to 0.

In contrast, if it is found, for example during prior operating tests performed on the turbojet or on a turbojet having the same characteristics, that a similar correction needs to be applied during the stages P1 and P2 of the turbojet, then it is possible to update the correction signal T2 during only one of these stages, e.g. during the stage P1.

Thus, under such circumstances, the second verifier module 32 verifies whether the current operating stage φ of the turbojet as transmitted by the FADEC to the second verifier module 32 is equal to the stage P1. Where appropriate, the verifier module 32 delivers a signal C2 equal to 1. If the current operating stage φ is different from P1, then the verifier module 32 delivers a signal C2 equal to 0.

In the example described herein, consideration is given to two operating stages P1 and P2 of the turbojet. Naturally, other stages could be taken into consideration.

A logic AND gate 33 having the signals C1 and C2 applied to its inputs then serves to verify whether both conditions relating respectively to temperature stability and to at least one operating stage of the turbojet are satisfied. The output C of the logic gate 33 is equal to 1 if C1 and C2 are identical and equal to 1 (i.e. if both of the above-mentioned conditions are verified), else it is equal to 0.

The signal C delivers by the logic gate 33 determines the output from the signal 34 as follows:

if C is equal to 1, then the output from the module 34 is equal to the real gain K of the integral corrector filter used for updating the error signal T2 described above; else the output from the module 34 is equal to zero.

In parallel with verifying conditions relating to temperature stability and to at least one operating stage of the engine, a subtractor module 35 evaluates the signal ε[nTe] at the instant t=nTe by subtracting the modeled signal T1 delivered by the digital model 10 from the measurement signal T4 delivered by the temperature sensor 40, using the following equation:

$$\epsilon[nTe] = T4[nTe] - T1[nTe]$$

The signal ε and the output from the module 34 are then delivered to a filter 36. The filter 36 comprises:

a multiplier element 36a adapted to multiply the signal ε[nTe] by the output from the module 34. In other words, the multiplier element 36a multiplies the signal ε[nTe] by the gain K providing the conditions relating to temperature stability and to at least one operating stage are verified, or else it multiplies by zero;

a delay cell 36c delivering the value T2[(n−1)Te]; and an adder element 36b adapted to calculate the value T2[nTe] using the above-specified equation.

It should be observed that at instant t=0 (i.e. for n=0), the value used as the initial value for the error signal T2[0] is $T2_0$, where $T2_0$ is a predefined value.

In the embodiment described herein, the value used as the initial value $T2_0$ is the value V2f stored in the non-volatile memory of the FADEC during a preceding operation of the turbojet.

In a variant, the initial value $T2_0$ may be taken to be equal to 0.

It should be observed that in known manner, the choices of an initial value $T2_0$, of the sampling period Te, and of the value for the gain K are the result of a compromise between performance and rate of convergence of the adaptive algorithm implemented for updating the signal T2.

The invention claimed is:

1. An estimation method for estimating a stream temperature in a turbojet, the method comprising:

digitally modeling the stream temperature based on of a modeled signal;

providing a measurement signal of the stream temperature which is measured using a temperature sensor disposed in the turbojet;

determining if a temperature stability condition is satisfied based on a derivative of the measurement signal of the stream temperature;

determining if a predetermined condition relating to at least one operating stage of the turbojet is satisfied;

calculating an updated error signal based on an error signal from an immediately previous sampling period and a difference between the modeled signal and the measurement signal of the stream temperature using a filter of order greater than or equal to 1, when both the temperature stability condition and the predetermined condition relating to at least one operating stage of the turbojet are satisfied;

and correcting the modeled signal by adding the updated error signal to the modeled signal, wherein, when at least one of the temperature stability condition or the predetermined condition relating to at least one operating stage of the turbojet is not satisfied, the error signal is not updated and the error signal from the immediately previous sampling period is used to correct the modeled signal;

wherein the error signal is updated based on an adaptive algorithm;

wherein the error signal is updated using an integral corrector type filter having a predetermined gain setting;

and wherein the predetermined gain setting is set to zero when at least one of the temperature stability condition or the predetermined condition relating to at least one operating stage of the turbojet is not satisfied.

2. An estimation method according to claim 1, further comprising using a non-volatile memory for storing a most recent updated error signal before stopping the turbojet.

3. An estimation method according to claim 2, wherein the error signal stored in the non-volatile memory is used for initializing the adaptive algorithm.

4. An estimation method according to claim 1, wherein the temperature stability condition is when the derivative of the measurement signal of the stream temperature is less than or equal to a predetermined threshold.

5. An estimator system for estimating a stream temperature of a turbojet, the system comprising:

means for digitally modeling the stream temperature based on a modeled signal;

means for providing a measurement signal of the stream temperature which is measured using a temperature sensor disposed in the turbojet;

means for determining if a temperature stability condition is satisfied based on a derivative of the measurement signal of the stream temperature;

means for determining if a predetermined condition relating to at least one operating stage of the turbojet is satisfied;

means for calculating an updated error signal based on an error signal from an immediately previous sampling period and a difference between the modeled signal and the measurement signal of the stream temperature using a filter of order greater than or equal to 1 when both the temperature stability condition and the predetermined condition relating to at least one operating stage of the turbojet are satisfied; and means for correcting the modeled signal by adding the updated error signal to the modeled signal, wherein, when at least one of the temperature stability condition or the predetermined condition relating to at least one operating stage of the turbojet is not satisfied, the means for calculating does not update the error signal and the means for correcting uses the error signal from the immediately previous sampling period to correct the modeled signal;

wherein the error signal is updated based on an adaptive algorithm;

wherein the error signal is updated using an integral corrector type filter having a predetermined gain setting; and wherein the predetermined gain setting is set to zero when at least one of the temperature stability condition or the predetermined condition relating to at least one operating stage of the turbojet is not satisfied.

6. A turbojet, comprising at least one estimator system for estimating a stream temperature according to claim 5.

7. An estimation method according to claim 1, wherein the error signal is updated by adding the error signal from the immediately previous sampling period to a product of the predetermined gain setting and the difference between the modeled signal and the measurement signal of the stream temperature.

* * * * *